United States Patent Office 3,238,130
Patented Mar. 1, 1966

3,238,130
ANTI-CHATTER LUBRICANT FOR LIMITED
SLIP DIFFERENTIAL
Howard J. Matson, Harvey, Ill., assignor, by mesne assignments, to Sinclair Research, Inc., New York, N.Y., a corporation of Delaware
No Drawing. Filed Sept. 23, 1958, Ser. No. 762,679
23 Claims. (Cl. 252—32.7)

This invention relates to an improved extreme pressure lubricant. More particularly, it relates to improved hypoid gear lubricants providing distress-free operation in so-called "locking" or "limited slip" differentials.

It is well known that the high pressures occurring in certain gears and bearings may cause a lubricant film to rupture, so that opposing metal surfaces contact each other. This metal contact results in scuffing, seizure, excessive wear, loss of efficiency, and ultimately in the failure of the mechanism. In addition, these high pressures on the oil film effect a rise in internal heat which may be increased by any friction resulting from the metal contacts through breaks in the oil film. Consequently, mechanisms in which high pressures are likely to occur demand lubricants that have both high lubricity and high film strength or extreme pressure properties.

It is recognized in the art that these two requirements are frequently antipathetic to each other. That is, an additive which has high film strength does not necessarily have good lubricity or "oiliness" and may, in fact, increase friction and heating in the oil film. Conversely, an additive having good lubricity or "oiliness" does not necessarily have good extreme pressure properties, and may in fact mask or interfere with the action of a separate extreme pressure compound.

Hypoid gears require a lubricant having both lubricity and extreme pressure properties. In this case, however, the extreme pressure projects are more important than the oiliness or friction properties, so that some increase in friction may be tolerated in order to realize better extreme pressure lubrication. This is particularly true with modern automotive equipment, where increased speeds and loads have increased extreme pressure requirements to the point where previously known gear lubricants are no longer suitable. More powerfully active extreme pressure compositions have been developed to meet the high speed requirements of passenger cars and commercial vehicles, as well as the high torque requirements of heavily loaded commerical vehicles.

Mineral oil lubricants are conventionally given extreme pressure properties by adding to them minor amounts of sulfur and/or phosphorus compounds. For example, a sulfurized hydrocarbon is frequently included with the mineral oil base, along with an oil-soluble compound containing sulfur and phosphorus, such as phosphosulfurized mineral oil bright stock or dialkyl dithiophosphate salts. These lubricants may frequently be improved further in extreme pressure characteristics by including sulfurized fatty esters (oils) or chlorinated paraffin in the formulation.

Recently, the controlled slip or limited slip differential has been increasingly adopted for use in passenger cars and light trucks. The advantages of the limited slip differential derive from its ability to transmit the greater driving force to the wheel that has the better traction. This is opposite to the action of a conventional differential where the power follows the path of least resistance and drives the wheel that is easiest to turn. To illustrate this difference, consider the case of an auto that has one rear wheel on a low friction surface such as ice, and the other rear wheel on a high friction surface such as dry concrete. Using a conventional differential in this situation, the only power that can be directed to the wheel on the high friction surface is the torque absorbed by the spinning wheel plus the friction in the differential gear set. Since this friction is minimal, no usuable power is realized. With the limited slip differential however, increased friction is put into the differential so that the driving force delivered to the wheel having the greater traction is about four times greater than that of the spinning wheel. This usually is sufficient to prevent stalling or wild wheel spin. However, the interplay of pressures and forces during turns under load results in a special lubrication problem, peculiar to the limited slip differential. The problem is manifest as a "chatter" that can range in intensity from a single "clunk" to a prolonged shudder of the entire car.

Selecting the proper lubricant for the limited slip differential (LSD) is complicated by the presence of two different mechanisms having different lubricant requirements in the same housing. The hypoid gearing demands a powerful extreme pressure lubricant suitable for both high torque and high speed driving conditions. Friction surfaces of clutch plates in the differential require a lubricant having a low coefficient of friction (high in oiliness or lubricity). These requirements are not only different, they are generally incompatible. Although it is known that most non-additive mineral gear oils will perform reasonably well in this unit as to chatter, such oils have insufficient load carrying properties. Therefore, an all-purpose gear oil must be used and will contain active extreme pressure elements such as sulfur, chlorine, lead, phosphorus and zinc, either alone or in the various combinations required to give a balanced hypoid gear lubricant, and yet not cause chatter distress in the LSD.

Up to this time, it has not been possible to provide a gear lubricant specifically designed to give good LSD performance in combination with a high level of extreme pressure gear lubrication under both high speed and high torque conditions. That is, prior to this time, no additive material has been known which can be used to give chatter-free LSD operation regardless of the type, nature or activity of other additive compounds present in the oil.

It therefore is an object of this invention to provide a hypoid gear lubricant that combines high speed and high torque extreme pressure performance with chatter-free operation in limited slip differentials. It is a further object of this invention to impart chatter-free LSD operation in an otherwise distress-prone extreme pressure gear lubricant, which has a moderate level of extreme pressure activity designed to prevent scoring and welding of gears under average or normal conditions.

To make a multi-purpose lubricant for differentials, a combination of additives is conventionally used to impart the needed extreme pressure properties. The combination usually includes sulfurized saturated or olefin hydrocarbons. These materials have been found necessary if the lubricant is to maintain its extreme pressure usefulness under high speed conditions. They are usually prepared by the reaction of hydrocarbons, preferably branched chain, of 8–32 carbon atoms with sulfur and comprise about 25 to 75% sulfur by weight. Although sulfurized hydrocarbons having as little as 10% sulfur by weight are sometimes used, the more highly sulfurized materials, in an amount from about 0.5 to 5% by weight of the lubricant composition, are most often used to give a fully satisfactory multi-purpose material.

Along with a sulfurized hydrocarbon, other materials can be used to help this material impart the desired extreme pressure properties to the lubricant. Among these materials are chlorinated hydrocarbons, and phosphosulfurized mineral oil. These latter two materials are usually used in combination with zinc dithiophosphate or sulfurized fatty esters.

A typical chlorinated hydrocarbon is a product usually containing about 25 to 75% chlorine by weight and made by the reaction of gaseous chlorine with a high-boiling saturated or unsaturated aliphatic or alicyclic hydrocarbon of say 8 to 32 carbon atoms. Similar hydrocarbons can be phosphosulfurized. A preferred material of this type is a phosphorus and sulfur treated mineral oil made by treating a 300 vis. bright stock with about 15% $P_2S_5$ at 440° F. for about 14 hours, then steaming at 300-325° F. for about 8 hours, followed by dehydration. The total phosphorus and sulfur content of such a material is low— from, say, about 1 to 10% or more, with at least about 0.5% each of S and P being present. A preferred type of sulfurized fatty ester or fatty oil containing about 5 to 15% S is made by treating sperm oil with about 12% sulfur at 340 to 350° F. for 6 hours, with a 1 hour air blow at 250° F. A perferred dialkyl dithiophosphate is, for example, zinc dimethylamyl dithiophosphate which is made by reacting the acid ester from the reaction of methyl amyl alcohol with $P_2S_5$, with zinc metal or zinc oxide to form the neutral reaction product. Other useful zinc dithiophosphates contain generally about 4 to 18 carbon atoms preferably 6 to 12, in each ester group. Of course all of the components of these additives are selected to give materials soluble in the base mineral oil.

When a chlorinated hydrocarbon-zinc dithiophosphate combination is used with the sulfurized hydrocarbon to impart further extreme pressure properties, these ingredients are effective when they total about 3–9% of the weight of the lubricant, while each is present in an amount greater than about 1%. When a phosphosulfurized mineral oil is used in combination with a sulfurized ester, in a multi-purpose gear oil lubricant, the finished composition usually contains a total of about 5–15% of these additives comprised of about 1–5% phosphosulfurized mineral oil and about 4–14% sulfurized fatty ester. Preferred ranges are about 1.5 to 3.5% for the sulfurized hydrocarbon, about 2–4% for the chlorinated hyrocarbon, about 2–4% for the dithiophosphate, about 1–4% for the phosphosulfurized oil and about 7–12% for the sulfurized fatty ester.

The mineral oil base stock conventionally used is of lubricating viscosity and can be, for instance, a solvent extracted or solvent refined oil obtained in accordance with conventional methods of solvent refining lubricating oils. Generally, lubricating oils have viscosities from about 35 to 250 SUS at 210° F. The base oil may be derived from paraffinic, naphthenic, asphaltic, or mixed base crudes, and if desired, a blend of solvent treated Mid-Continent neutrals and Mid-Continent bright stocks may be used.

The best multi-purpose gear oils require a combination of extreme pressure additives amounting to about 5 to 20% of the total weight of the lubricant, usually about 8–13%. Two such oils in widespread use today are:

Composition A

| | Parts |
|---|---|
| Solvent refined mineral oil | 81 |
| Sulfurized sperm oil | 9 |
| Sulfurized olefin hydrocarbon | 2 |
| Phosphosulfurized mineral oil | 2 |

Composition B

| | Parts |
|---|---|
| Solvent refined mineral oil | 91 |
| Sulfurized olefin hydrocarbon | 2.5 |
| Chlorinated paraffin | 3.5 |
| Zinc dialkyl dithiophosphate | 3.0 |

Composition A meets the present military 2105 specification and has been in use for 8–10 years. It performs well in perhaps 90% of today's applications, but it starts breaking down in some high-load, high-speed sustained operations. Composition B, on the other hand, overcomes these shortcomings but it may cause rusting and long term wear. For this reason a small quantity of lauric acid is sometimes included in Composition B to inhibit rusting, apparently by stabilizing the lubricant.

These compositions are among those which have been found to cause chattering when used to lubricate a limited-slip differential. By this invention, however, it has been found possible to minimize or eliminate the chatter associated with these compositions while maintaining their extreme pressure properties under the most severe hypoid gear operation such as shock or bump loading and sustained high speed operation under high load conditions.

In general, this invention comprises extreme pressure mineral oil lubricant compositions containing oil-soluble organic sulfur compounds and perhaps other auxiliary extreme pressure agents, together with a minor amount, sufficient to provide chatter-free limited slip differential lubrication, of an oil-soluble organic nitrogen-containing additive material. The material may be an amine or a treated amine. Primary, secondary and tertiary aliphatic amines containing 6 or more carbon atoms and oxyalkylated amines have been found to be operable in reducing or eliminating chatter in the limited slip differential when added to extreme pressure compositions such as those outlined usually in amounts of about 0.1 to 1% by weight of the finished lubricant, preferably 0.15 to 0.5%. The amines I employ are base oil-soluble and preferably contain 6 to 32 carbon atoms. The useful amines include also those secondary and tertiary amines where two alkyl substituent chains are joined to form hetero-N-cyclic compounds. A carbon content of four or five atoms per molecule is sufficient to give these compounds oil-solubility. Preferred additives are non-aromatic amines, for instance the tertiary amine, dimethyl octadecyl amine (Armour DM18D), which has been found effective to prevent chatter in concentrations as low as 0.05% in some compositions. Since the durability factor of this improvement may vary, for added safety a concentration of about 0.2 to 0.25 percent is generally used. Aromatic amines, such as diphenyl amine and dimethyl aniline have been found, in general, to be ineffective or inefficient in reducing chatter. The useful oxylalkylated amines include the reaction products of aliphatic amines, such as those described, with up to five moles of a $C_2$ to $C_4$ alkylene oxide, such as ethylene oxide, per mole of amine.

An oxyalkylated amine may be prepared by reacting about 5 to 75 weight percent, preferably about 10 to 50 weight percent of a $C_2$ to $C_4$ alkylene oxide with about 25 to 95 weight percent, preferably about 50 to 90 weight percent of an amine. Mixtures of alkylene oxides and mixtures of amines may be employed. The oxyalkylation reaction is conducted at a temperature of about 250° F. to 400° F., preferably about 300° F. to 350° F. in the presence of an oxyalkylation catalyst, such as sodium methylate. The amine may be dissolved, prior to the reaction in an inert aromatic hydrocarbon solvent such as xylene. A preferred oxyalkylated amine is the product of ethylene oxide treatment of an aminated mixture of tallow fatty acids which includes materials of 16 to 18 carbon atoms. This product is commercially available under the name "Ethomeen T–12."

Compositions made according to this invention may also contain, besides extreme pressure and anti-chatter ingredients, minor amounts of pour depressors, foam inhibitors such as silicone polymers, viscosity index improvers such as oil-soluble acrylate polymers, etc. It has been found that lauric acid is an effective rust preventive in the compositions of the invention. The compositions of the invention may contain for instance 0–0.01% anti-foam agent, 0–0.5% VI improver, 0–0.25% rust preventive, 0.1–1% anti-chatter agent, 0.5 to 5% sulfurized hydrocarbon, other extreme pressure agents in a range of 3–9% for a combination of chlorinated paraffin and zinc dithiophosphate or a range of 5–15% for a combination of phosphosulfurized mineral oil and a sulfurized ester, and the balance a mineral oil of lubricating grade sufficient to give a SAE 90 grade gear oil.

Specific compositions embodying this invention are the following, but it is to be understood that these samples are illustrative only and not limiting. Number 95 oil is a solvent refined Mid-Continent neutral oil having a viscosity of 200 SUS at 100° F., and a VI of 95. Number 20 oil is a solvent refined Mid-Continent bright stock having a viscosity of 120 SUS at 210° F. and a VI of 85. The sulfurized hydrocarbon is a composition in which the hydrocarbon has a structure similar to di- or polyisobutylene and contains about 46% S. The chlorinated hydrocarbon is one containing about 50% Cl and having a branched chain paraffinic structure. The phosphosulfurized oil was prepared from a solvent refined Mid-Continent bright stock having a viscosity (SUS) of 1949 at 100° F. and contained less than 2.4% S and 3.0–3.4% P, see Patent No. 2,715,612.

The acrylate VI improver is a 40% solution in mineral oil of a methacrylate ester polymer wherein the methacrylic acid is esterified with a mixture of cetyl, lauryl and octyl groups and the molecular weight of the polymer is about 10,000 to 15,000. The silicone anti-foam agent was a liquid methyl silicone polymer having a viscosity at 25° C. of about 100 cs.

| Wt. of Composition | C | D | E |
|---|---|---|---|
| No. 95 Oil | 20.00 | 32.00 | 20.00 |
| No. 20 Oil | 70.86 | 54.28 | 70.81 |
| Sulfurized Hydrocarbon | 2.50 | 2.50 | 2.50 |
| Chlorinated Hydrocarbon | 3.00 | | 3.00 |
| Zinc dimethylamyl dithiophosphate | 3.00 | | 3.00 |
| Phosphosulfurized oil | | 2.00 | |
| Sulfurized sperm oil (12% S) | | 9.00 | |
| Benzothiazyl disulfide | | 0.05 | |
| Lauric Acid | 0.14 | 0.15 | 0.14 |
| Petrolatum | 0.10 | 0.10 | 0.10 |
| Acrylate VI improver | 0.15 | 0.10 | 0.15 |
| Trioxane | | 0.02 | |
| Silicone anti-foam agent | 0.005 | 0.005 | 0.005 |
| Dimethyl octadecyl amine | 0.20 | 0.25 | |
| Ethylene oxide-treated tallow amine, preferred composition described above | | | 0.25 |

These and other compositions were evaluated by testing under actual driving conditions using a Chevrolet and/or a De Soto equipped with a limited-slip differential and using the following procedure:

After flushing the differential with a test sample, draining it thoroughly and recharging with another portion of the test sample, the car was driven through a series of figure 8's and circles in both directions at intermittent throttle. This procedure insured the lubricant a greater chance of working in between the friction clutch plates.

From a stop position each car was accelerated in a tight left circle through a series of from 3 to 5 slow, moderate and fast accelerations; the chatter intensity, if any, was rated for each acceleration speed.

In a tight left circle, the car was started in motion while applying moderate braking action and accelerating to 5–8 m.p.h. A minimum of 3 complete circles was made at a steady pace with the brake on; the chatter intensity, if any, was rated for each circle. Then the procedure was repeated for right turns.

The samples described gave completely chatter-free performance while giving adequate extreme pressure protection. When Composition A—which is equivalent to Composition D but without the amine component—was tested under these conditions, it gave a medium chatter rating. Likewise, when Composition B—the equivalent of Compositions C or E without the amine component—was tested under these conditions it gave a very heavy chatter rating.

Samples were also prepared which had a composition similar to Composition B but wherein small amounts of lauric acid and a heterocyclic nitrogen compound were incorporated. A sample of Composition B which contained octyl morpholine gave a satisfactory chatter rating as did samples containing morpholine, pyridine and piperazine.

That certain of these additive compounds, particularly those containing a basic nitrogen atom, should be so effective in reducing LSD chatter, is quite contrary to expectations. The LSD requirements appear to be based on oiliness or lubricity, and compounds which give the lowest friction or the least "stick-slip" are theoretically expected to be less likely to cause chatter, or the most likely to improve chatter, once it occurs. As is well known, nitrogen compounds in general, and basic nitrogen compounds in particular, tend to increase friction and cause poorer lubrication. It is also significant to note the relatively minor percentages of these materials that are effective, indicating a true additive effect. This contrasts with the massive doses, say 10%, of a recognized oiliness material such as mixed fatty acids found to be required to effect improved but less-than-perfect performance.

I claim:

1. A method for reducing chatter in a limited slip differential gear assembly which comprises lubricating the assembly with a gear lubricant consisting essentially of base mineral oil of lubricating viscosity, about 5 to 20 percent by weight of total extreme pressure agent and about 0.1 to 1 percent by weight of an oil-soluble anti-chatter agent selected from the group consisting of octyl morpholine, tertiary aliphatic amines and oxyalkylated fatty amines.

2. The method of claim 1 in which the extreme pressure agent is selected from the group consisting of chlorine, sulfur, phosphorus, lead and zinc compounds.

3. The method of claim 2 in which the anti-chatter agent has 6 to 32 carbon atoms.

4. The method of claim 3 in which the anti-chatter agent is oxyalkylated and has up to five moles of a $C_2$ to $C_4$ alkylene oxide per mole of anti-chatter agent.

5. A method for reducing chatter in a limited slip differential gear assembly which comprises lubricating the assembly with a lubricant consisting essentially of a base mineral oil of lubricating viscosity, about 0.5 to 5 percent sulfurized hydrocarbon, a small amount, effective to give extreme pressure properties, of an additive combination selected from the group consisting of the combination of chlorinated hydrocarbons and zinc dithiophosphate and the combination of phosphosulfurized hydrocarbons and sulfurized fatty esters, and about 0.1 to 1 percent of an oil-soluble anti-chatter agent selected from the group consisting of octyl morpholine, tertiary aliphatic amines and oxyalkylated fatty amines.

6. The method of claim 5, where the mineral lubricating oil contains about 0.5 to 3.5 percent sulfurized olefin hydrocarbon, about 1–4 percent phosphosulfurized mineral oil, about 7–12 percent sulfurized sperm oil, and 0.15 to 0.5 percent of the anti-chatter agent.

7. The method of claim 6 where the anti-chatter agent is dimethyl octadecyl amine.

8. The method of claim 6 where the anti-chatter agent is the ethylene oxide-treated tallow amine.

9. A gear oil consisting essentially of about 0.5 to 5 percent base-oil soluble sulfurized hydrocarbon and a small amount, effective to give extreme pressure properties, of a base-oil soluble additive combination selected from the group consisting of the combination of chlorinated hydrocarbon and zinc dithiophosphate, and the combination of phosphosulfurized hydrocarbon and sulfurized fatty ester, about 0.1 to 1 percent of an agent selected from the group consisting of octyl morpholine, oil-soluble tertiary aliphatic amines of at least 6 carbon atoms and oil-soluble oxyalkylated aliphatic amines having up to five $C_2$ to $C_4$ alkylene oxide groups per mole of amine, and a base mineral oil of lubricating grade.

10. A gear oil consisting essentially of about 0.5–3.5% base-oil soluble sulfurized olefin hydrocarbon, about 1–4% base-oil soluble phosphosulfurized mineral oil, about 7–12% base-oil soluble sulfurized sperm oil, about 0.15–0.5% of an oil-soluble tertiary amine and a base mineral oil of lubricating grade.

11. The composition of claim 10 where the amine is dimethyl octadecyl amine.

12. A gear oil consisting essentially of about 0.5 to 5% base oil-soluble sulfurized hydrocarbon of 8 to 32 carbon atoms containing about 10–75% sulfur by weight and a small amount, effective to give extreme pressure properties, of a base oil-soluble additive selected from the group consisting of chlorinated hydrocarbon of 8 to 32 carbon atoms containing about 25–75% chlorine by weight, zinc dialkyl dithiophosphate, whose alkyl groups have about 4–18 carbon atoms, phosphosulfurized hydrocarbon of about 8 to 32 carbon atoms containing about 1–10% total sulfur and phosphorus and at least about 0.5% each of sulfur and phosphorus, sulfurized fatty ester containing about 5 to 15% sulfur, and mixtures of the same, about 0.1 to 1% of an agent selected from the group consisting of octyl morpholine, oil-soluble tertiary aliphatic amines of 6 to 32 carbon atoms and oil-soluble oxyalkylated aliphatic amines having up to five $C_2$ to $C_4$ alkylene oxide groups per mole of amine, and a base mineral oil of lubricating grade.

13. A gear oil consisting essentially of about 0.5 to 5% base oil-soluble sulfurized hydrocarbon of 8 to 32 carbon atoms containing about 25–75% sulfur by weight, about 5 to 20% of a base oil-soluble extreme pressure additive combination selected from the group consisting of about 3–9% of a base oil-soluble combination providing at least about 1% each of chlorinated paraffinic hydrocarbon of 8 to 32 carbon atoms containing about 25–75% chlorine by weight, and zinc dialkyl dithiophosphate, whose alkyl groups have about 4–18 carbon atoms, and about 5–15% of a base oil-soluble tertiary combination providing about 1–5% of a phosphosulfurized hydrocarbon of about 8 to 32 carbon atoms containing about 1–10% total sulfur and phosphorus and at least about 0.5% each of sulfur and phosphorus and about 4–14% of a sulfurized fatty ester containing about 5 to 15% sulfur, about 0.1 to 1% of an agent selected from the group consisting of octyl morpholine, oil-soluble tertiary aliphatic amines of 6 to 32 carbon atoms and oil-soluble oxyalkylated aliphatic amines having up to five $C_2$ to $C_4$ alkylene oxide groups per mole of amine, and a base mineral oil of lubricating grade.

14. The composition of claim 13 in which the anti-chatter agent is dimethyl octadecyl amine.

15. The composition of claim 14 where the anti-chatter agent is an ethylene oxide-treated tallow amine.

16. A gear oil consisting essentially of about 1.5 to 3.5% base oil-soluble sulfurized olefin hydrocarbon containing about 25–75% sulfur by weight, about 2–4% base oil-soluble chlorinated hydrocarbon containing about 25–75% chlorine by weight, about 2–4% base oil-soluble zinc dialkyl dithiophosphate whose alkyl groups have about 4–18 carbon atoms, about 0.15 to 0.5% of a base oil-soluble tertiary aliphatic amine and a base mineral oil of lubricating grade.

17. A gear oil consisting essentially of about 0.5 to 3.5% base oil-soluble sulfurized olefin hydrocarbon containing about 25–75% sulfur by weight, about 1–4% base oil-soluble phosphosulfurized mineral oil containing about 1–10% total sulfur and phosphorus, about 7–12% sulfurized sperm oil containing about 5 to 15% sulfur, about 0.15 to 0.5% of a base oil-soluble tertiary aliphatic amine and a base mineral oil of lubricating grade.

18. A gear oil consisting essentially of about 0.5 to 5% base oil soluble sulfurized hydrocarbon and a small amount, effective to give extreme pressure properties, of a base oil soluble additive selected from the group consisting of chlorinated hydrocarbon, zinc dithiophosphate, phosphosulfurized hydrocarbon, sulfurized fatty ester and mixtures of the same, about 0.1 to 1% of an anti-chatter agent selected from the group consisting of octyl morpholine, oil-soluble tertiary aliphatic amines of at least 6 carbon atoms and oil-soluble oxyalkylated aliphatic amines having up to five $C_2$ to $C_4$ alkylene oxide groups per mole of amine, and a base mineral oil of lubricating grade.

19. A gear oil consisting essentially of about 0.5 to 5% base oil soluble sulfurized hydrocarbon, a base oil soluble extreme pressure combination selected from the group consisting of about 3–9% of a chlorinated hydrocarbon and zinc dithiophosphate each being present in an amount greater than about 1% and about 5–15% of a phosphosulfurized mineral oil and a sulfurized fatty ester, about 0.1 to 1% of an anti-chatter agent selected from the group consisting of octyl morpholine, oil-soluble tertiary aliphatic amines of at least 6 carbon atoms and oil-soluble oxyethylated aliphatic amines having up to five ethylene oxide groups per mole of amine, and a base mineral oil of lubricating grade.

20. A gear oil consisting essentially of about 1.5–3.5% base oil-soluble sulfurized olefin hydrocarbon, about 2–4% base oil soluble chlorinated hydrocarbon, about 2–4% base oil soluble zinc dialkyl dithiophosphate, about 0.15–0.5% of a base oil-soluble agent selected from the group consisting of octyl morpholine, tertiary aliphatic amines of at least 6 carbon atoms and oxyethylated aliphatic amines having up to five ethylene oxide groups per mole of amine, and a base mineral oil of lubricating grade.

21. The composition of claim 20 where the anti-chatter agent is dimethyl octadecyl amine.

22. The composition of claim 20 where the anti-chatter agent is an ethylene oxide-treated tallow amine.

23. The composition of claim 12 in which the agent is octyl morpholine.

References Cited by the Examiner
UNITED STATES PATENTS

| | | | |
|---|---|---|---|
| 2,218,132 | 10/1940 | Lincoln | 252—45 |
| 2,268,608 | 1/1942 | McNulty et al. | 252—46.7 |
| 2,288,288 | 6/1942 | Lincoln | 252—46.7 X |
| 2,316,925 | 4/1943 | Whittier et al. | 252—46.7 |
| 2,364,284 | 12/1944 | Freuler | 252—32.7 |
| 2,696,473 | 12/1954 | Sokol | 252—51 X |
| 2,715,612 | 8/1955 | Beare | 252—46.6 |
| 2,851,422 | 9/1958 | Manteuffel et al. | 252—33.4 X |

DANIEL E. WYMAN, *Primary Examiner.*

JULIUS GREENWALD, *Examiner.*